United States Patent [19]

van der Piepen et al.

[11] 4,278,451
[45] Jul. 14, 1981

[54] APPARATUS FOR EXTRACTING GRANULAR OR FINELY DIVIDED SOLID MATERIALS FROM A GAS UNDER PRESSURE

[75] Inventors: Rolf van der Piepen, Bochum-Stiepel; Frohmut Vollhardt, Siegen-Bürbach, both of Fed. Rep. of Germany

[73] Assignee: Gutehoffnungshütte Stockrade AG, Oberhausen, Fed. Rep. of Germany

[21] Appl. No.: 54,804

[22] Filed: Jul. 5, 1979

Related U.S. Application Data

[63] Continuation of Ser. No. 762,575, Jan. 26, 1977, abandoned.

[30] Foreign Application Priority Data

Jan. 29, 1976 [DE] Fed. Rep. of Germany ....... 2603274

[51] Int. Cl.³ .............................................. B01D 47/00
[52] U.S. Cl. ............................... 55/227; 48/DIG. 2; 55/228; 55/244; 55/355; 55/394; 55/431; 55/462; 55/466
[58] Field of Search .................. 55/95, 227–228, 55/244, 246, 247, 355, 466, 394, 462, 431; 48/77, 101, 128, 197 R, 210, DIG. 2; 134/25 R; 261/81, 91; 209/17, 173

[56] References Cited

U.S. PATENT DOCUMENTS

| | | | |
|---|---|---|---|
| 51,128 | 11/1865 | Bickford | 261/81 |
| 756,643 | 4/1904 | Jester | 55/228 |
| 885,308 | 4/1908 | Woodall et al. | 48/101 X |
| 1,533,835 | 4/1925 | Dawley | 55/462 X |
| 1,780,830 | 11/1930 | Lessing | 209/173 |
| 1,828,646 | 10/1931 | Dantsizen | 55/228 X |
| 1,937,190 | 11/1933 | Chance | 209/173 |
| 2,196,451 | 4/1940 | Holzer | 209/17 |
| 2,238,997 | 4/1941 | Gaymon | 209/173 |
| 2,496,703 | 2/1950 | Ekbom | 209/173 X |
| 2,716,598 | 8/1955 | Moses | 48/DIG. 2 X |
| 2,721,065 | 10/1955 | Ingram | 55/256 X |
| 2,764,289 | 9/1956 | Scheid | 209/173 |
| 2,948,351 | 8/1960 | Phillips et al. | 55/462 X |
| 3,360,460 | 12/1967 | Weston | 261/91 X |
| 3,437,561 | 4/1969 | Squires | 48/77 UX |
| 3,702,656 | 11/1972 | Gutterman et al. | 209/173 X |
| 3,791,104 | 2/1974 | Clitheroe | 55/95 X |
| 3,823,530 | 7/1974 | Miyashita et al. | 55/228 X |
| 4,036,606 | 7/1977 | Zimmermann et al. | 55/228 X |
| 4,073,629 | 2/1978 | Funk | 48/77 |

FOREIGN PATENT DOCUMENTS

| | | | |
|---|---|---|---|
| 1206381 | 2/1960 | France | 134/25 R |
| 47-23776 | 1/1972 | Japan | 55/244 |

*Primary Examiner*—Kathleen J. Prunner
*Attorney, Agent, or Firm*—Becker & Becker, Inc.

[57] ABSTRACT

A method of and apparatus for extracting granular or finely divided or powdered solid materials from a gas under high pressure, particularly slag from synthesized gas generated in connection with the gasification of coal. The invention is carried out by using a U-shaped receptacle containing a molten medium which seals off the gas chamber from the atmosphere and has a higher specific gravity than said solid materials. The solid materials are pushed below the surface of the molten medium and, by means of lateral movement, are floated up to the atmosphere, where they are contained. The U-shaped receptacle has a first tank-like arm and a second tubular arm, with a connecting conduit joining the two. This connecting conduit is inclined upwardly towards the second arm. The first arm, which is acted upon by gas pressure, contains lowering means for lowering the solid materials to the level of the connecting conduit.

5 Claims, 4 Drawing Figures

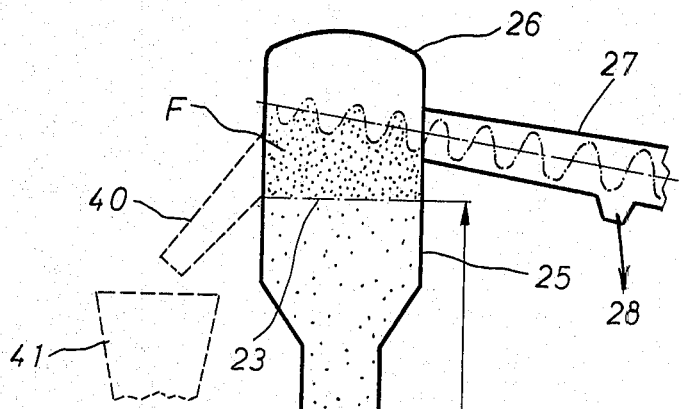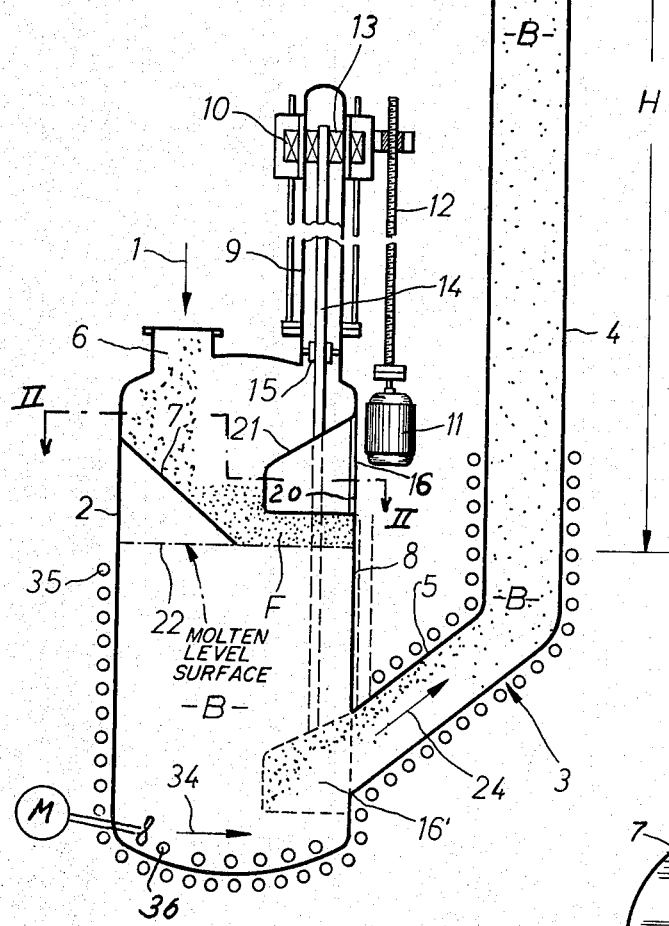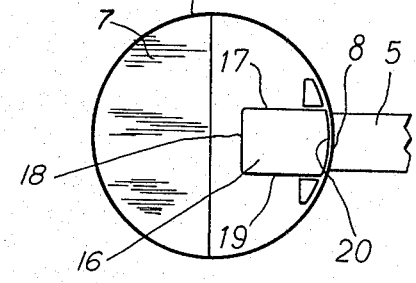
Fig.1
Fig.2

APPARATUS FOR EXTRACTING GRANULAR OR FINELY DIVIDED SOLID MATERIALS FROM A GAS UNDER PRESSURE

This is a continuation of co-pending application Ser. No. 762,575—van der Piepen et al filed Jan. 26, 1977, now abandoned.

The present invention relates to a method of extracting granular or finely divided solid materials from a gas under high pressure, in particular slag from synthesized gas generated in connection with the gasification of coal. The invention further relates to an apparatus for carrying out this method.

During the generation of synthesized gas by gasification of coal, in which connection the gas is under a pressure of, for example, 50 atmospheres gauge, it becomes particularly difficult to separate granular and finely divided solid materials such as slag and ungassed coal out of the gas. Mechanical means such as sluices or charging valves, extractors, or valves may be used. These means, however, are worn out in a short period of time due to the nature of the granular or finely divided and sometimes even red hot solid materials, such as sharp edges, jagged surfaces, as well as great hardness or the like. This makes it difficult to properly maintain the high pressure of the gas. The parts of such sluices, extractors and valves subject to wear must therefore be replaced after a short time, causing shut down of the gasification apparatus. It is also difficult to achieve a highly satisfactory sealing effect because solid materials settle between the moving parts of the apparatus.

It is an object of the present invention to produce a method and apparatus of the above described type, according to which the previously mentioned drawbacks of known extracting means are entirely or largely eliminated, thereby insuring a disturbance free operation of the apparatus for gasification of coal.

These and other objects and advantages of the present invention will appear more clearly from the following specification in connection with the accompanying drawings, in which:

FIG. 1 shows a device with a plunger or hood-like lowering device pursuant to the present invention.

FIG. 2 is a horizontal section through the apparatus of FIG. 1 along the line II—II thereof.

Figure 3:
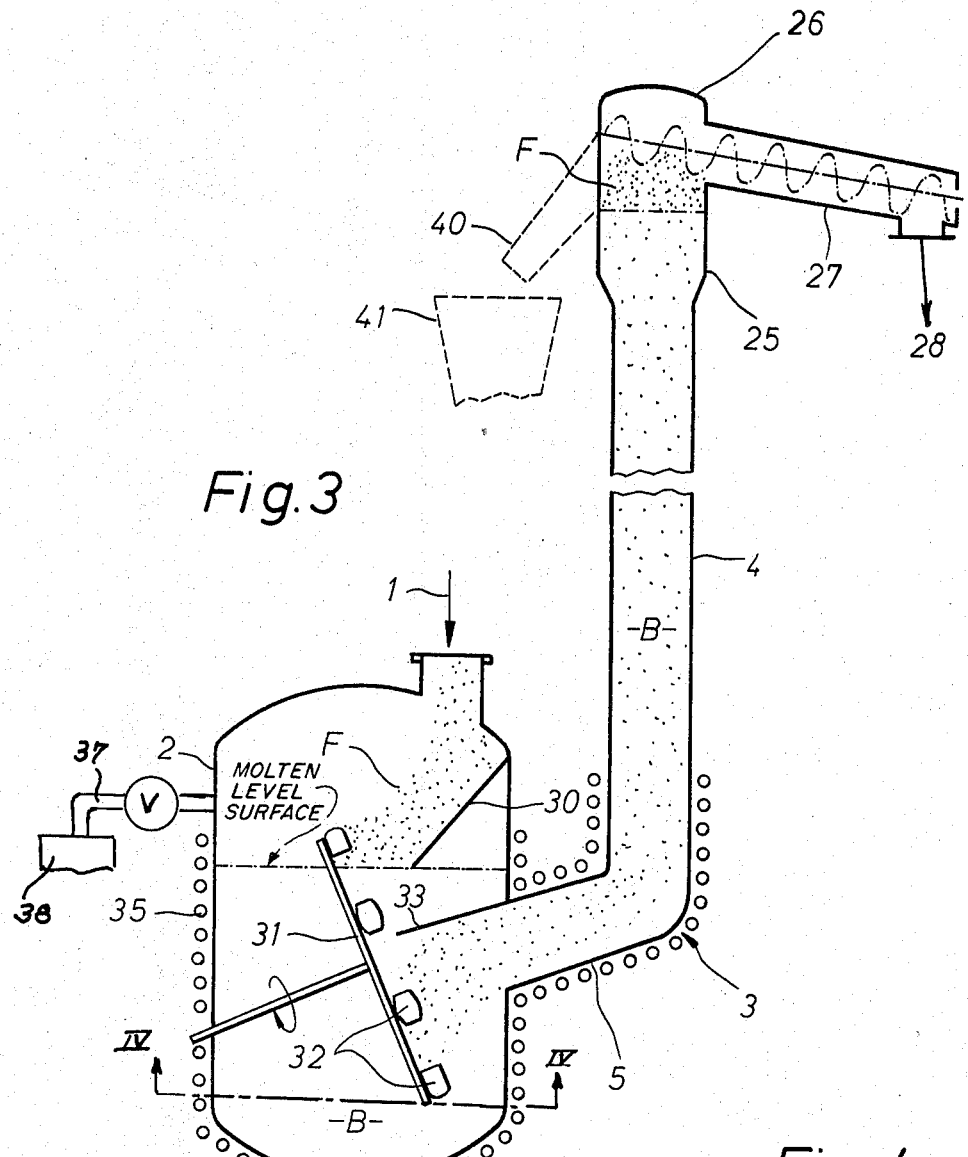
FIG. 3 shows a further specific embodiment of the invention with a bucket-like lowering device.
Figure 4:
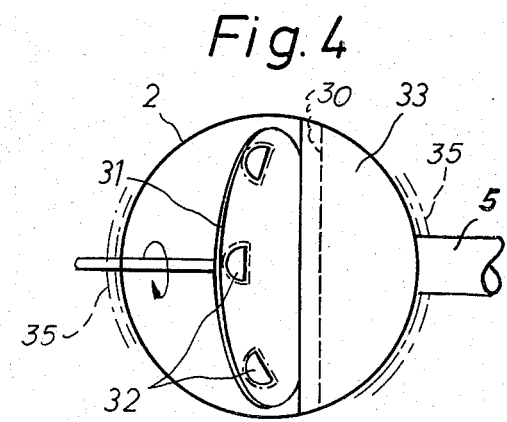
FIG. 4 is a section through the apparatus of FIG. 3 along the line IV—IV thereof.

The method of extraction of solid materials from a gas pursuant to the present invention is characterized primarily by using a U-shaped receptacle containing a molten medium of a higher specific gravity than the solid materials, said molten medium sealing off the gas space or chamber from the atmosphere. The present invention is further characterized in that the solid materials are pushed below the surface of the molten medium and, by means of a lateral movement, are floated to the atmosphere.

At least a portion of the extraction movement of the solid materials is insured by the floating in said molten medium of a higher specific gravity, in which connection the pushing below the molten medium and the lateral movement are carried out substantially free of wear. The floating of the solid materials proceeds without mechanical assistance. For their lateral movement, the solid materials may float in an inclined conduit of the U-shaped receptacle in order to subsequently float vertically up into the tubular arm of the U-shaped receptacle.

The lateral movement of the solid material in the U-shaped receptacle may also be effected by a laterally moving stream of the molten medium or by a combined movement of a laterally moving stream of the molten medium and an inclined guiding of the solid materials. Mechanical means, such as bucket-wheel arrangements, are also available for effecting the lateral movement of the solid materials.

Preferably lead, zinc coated lead, or a lead compound is made available as the molten medium into which the solid materials are introduced, laterally moved, and floated. Antimony or any other suitable heavy metal with a low melting or fusing temperature may be used.

An intermediate heat exchanger having a liquid metal bath is known from German disclosure (Auslegeschrift) 2,055,415, which uses a U-shaped receptacle fillable with molten heavy metal into which a gas feed pipe is immersed. However, the above publication does not teach a pressing below the surface and a floating of solid materials and therefore does not disclose the method and apparatus of the present invention.

The apparatus for carrying out the method of the present invention comprises a U-shaped receptacle having a tank-like arm which is acted upon by gas pressure. In the tank-like arm is a lowering device for lowering the solid materials to the level of a connecting conduit which is upwardly inclined towards a tubular second arm. The lowering device may be shaped like a hood and arranged along one wall of the tank-like arm. One side wall of the lowering device at the level of the connecting conduit is open, and the lid section of the lowering device, in the direction of the connecting conduit, is upwardly inclined.

As previously mentioned, the lowering device may have a bucketwheel arrangement. The buckets plunge the solid materials down below the surface of the molten medium and, during a 180° reversal, release the solid materials into the tubular arm or the connecting conduit.

As a further refinement of the present invention, the U-shaped receptacle is provided with inner and/or outer heating means. This insures that after shut down of the apparatus and solidification of the molten medium, the molten medium can again be quickly liquified. Pursuant to a further specific embodiment of the present invention, the upper end of the tubular arm is provided with a lid, in which connection the solid materials are withdrawn by means of a lateral extraction. The vapor which forms in the upper end of the tubular arm of the U-shaped receptacle condenses on the lid, while the solid materials are withdrawn laterally where they are subjected to further treatment. Slag from synthesized gas, which slag carries lead particles on its circumference, is broken up by milling and the coal particles, as well as the lead particles which until then were enclosed by the slag, are separated from the slag by treatment in any suitable manner.

The volume of the pressurized tank-like arm of the receptacle either corresponds to the entire quantity of molten medium in the apparatus, or the pressurized arm is connected to a second receptacle for receiving the quantity of molten medium from the arm and the connecting conduit. Thus if the pressure suddenly drops in the apparatus and in the pressurized arm of the apparatus, the molten medium in the pressurized arm can either rise or pass into the additional second receptacle, without thereby filling the lowering device or even the conduit of the apparatus with molten metal.

Referring now to the drawings in detail, the solid materials pass in the direction of the arrow 1, for instance by the force of gravity out of a gasification reactor which is not shown, into the tank-like arm 2 of a U-shaped receptacle which is generally designated as 3. The receptacle 3 has a tubular second arm 4. A connecting conduit 5 connects the two arms 2 and 4. The arm 2 is formed as a round pressure resistant tank and has a feed connection 6 and an inclined partition or wall 7 which points toward the side wall section 8 of the tank.

A dome-like conduit connection 9, the top of which is closed off, is mounted parallel to the feed connection 6. A circular permanant magnet 10 is made upwardly and downwardly movable on the outer wall of the conduit connection 9 by means of an electric motor 11 and a spindle 12. Within the dome-like connection 9 is arranged a corresponding permanent magnet 13 which is vertically displaceable and which has a downwardly directed rod 14 which at 15 may additionally be guided within the non-magnetic dome-like connection 9.

The lower end of the rod 14 supports a lowering device 16 which, as shown in FIG. 2, has a rectangular cross section. The side walls 17, 18, 19 of the lowering device 16 have a hood-like form and the side wall 20 of the hood is left open.

The cover section 21, which is connected to the rod 14, is inclined upwardly toward the side wall section 8, whereby an effect, as will be set forth in greater detail below, is exerted upon the solid materials which are brought into the area of the lowering device 16 by means of the inclined wall 7, as shown in FIG. 1.

The pressure resistant arm 2, the connecting conduit 5, as well as the second arm 4 of the receptacle 3 are filled with a molten medium, preferably molten lead or a lead compound in liquid form. The weight of the molten medium column over the height H between the two molten medium level surfaces 22, 23 corresponds to the pressure above the molten medium in the arm 2.

By means of the motor 11 and the rod 14, the lowering device 16 may be lowered as far as the broken or dashed line position 16', the solid materials F being contained in the hood-like space of the lowering device 16. When the lowering device 16 reaches the position 16', the solid materials F float in the direction of the arrow 24 into the upwardly slanted connecting conduit 5. From there the solid materials F pass into the vertical arm 4 of the receptacle 3 and float up into the larger space 25 of the arm 4. The top of the space 25 is closed off by a lid 26 on which the molten medium vapor may condense and the condensate be returned to the arm 4. With the aid of a worm gear 27 or the like, the solid material which has floated up is carried out laterally and passed in the direction of the arrow 28 through an outlet to a separating plant (not shown) in whch the slag is separated from the carbonaceous and solidified lead particles.

Pursuant to the specific embodiment shown in FIG. 3, the solid material F passes into the arm 2, and by means of an inclined wall 30, into the area of the bucket arrangement 31 by means of which the solid material F is brought below the surface of the molten medium B in arm 2. The solid material F passes out of the buckets 32 up against the upwardly inclined wall 33 and thereafter into the upwardly inclined connecting conduit 5. From there the solid materials float up into the second arm 4 of the receptacle 3.

To the apparatus shown in FIGS. 1 and 2, a mixer or stirring-type device M may be added which imparts to the molten medium in the arm 2 a movement directed in the direction of the arrow 34, whereby the lateral movement of the solid materials is assisted and complemented.

The arm 2, as well as the arm 4, have an outer heating means 35 and a heating means 36 which extends into the receptacle 3 and thereby into the molten medium bath, so that the heavy metal is maintained in a molten medium state or, when the apparatus is shut down, the heavy metal can be liquified.

In order, when the pressure above the molten medium level 22 in the arm 2 drops, to prevent a quantity of molten medium from passing out of the arm 4 into the gasification apparatus or into the dome-like conduit connection 9, the arm 2 is either made large enough to accommodate the additional quantity of molten medium from the arm 4, or it has an auxiliary receptacle 38 into which the subject quantity of molten medium may flow through the conduit 37 if the pressure in the arm 2 drops. Interposed in conduit 37 is a check valve V which is normally closed by the pressure in arm 2 and only opens when said pressure drops below a predetermined level.

Instead of being carried out by the worm gear 27, the solid materials F may be carried out above the surface 23 by the force of gravity through a chute 40 into a bin 41, for example.

It is, of course, to be understood that the present invention is, by no means, limited to the specific showing in the drawings, but also comprises any modifications within the scope of the appended claims.

What we claim is:

1. An apparatus for collecting solid, particulate material in a gas under pressure, comprising means forming a gas-tight, primary chamber having an inlet at the top of said primary chamber connected to a source of gas and particulate matter under pressure, for deposit of said particulate matter into said chamber, and a secondary chamber interconnected by a passage between the lower ends of said chambers, the secondary chamber extending upwardly to a substantially greater height than said primary chamber, and said passage being inclined upwardly toward said secondary chamber, molten liquid metal of higher specific gravity than said particulate matter being disposed in said chambers and passage and extending upwardly in said secondary chamber to a higher level than in said primary chamber, the difference in height representing the difference in pressures above the liquid in the two chambers, an inclined surface in said primary chamber below said inlet to guide particulate matter fed through said inlet toward one side of said primary chamber to float on said molten liquid in said primary chamber, and a conveying means in said primary chamber movable through said liquid for forcing said particulate matter on the surface of said molten liquid metal downwardly through said liquid to said passage for floating movement through said liquid up said inclined passage to said secondary chamber and upwardly to the surface in said secondary chamber, and means to remove said particulate matter from the surface of said molten liquid metal in said secondary chamber.

2. An apparatus according to claim 1, wherein said conveying means comprises a pusher lowering means for said particulate matter, said lowering means being open at the bottom and one side of said lowering means being open for communication with the connecting passage when said lowering means is at the level of the entrance to said connecting passage, and the top of said lowering means flaring towards said open side of said lowering means.

3. An apparatus according to claim 2, in which said chambers have outer heating means associated therewith.

4. An apparatus according to claim 1, in which said conveying means is a bucket wheel arrangement.

5. An apparatus according to claim 1, which includes means associated with said primary chamber and operable in response to a predetermined pressure drop in said primary chamber to receive liquid therefrom.

* * * * *

UNITED STATES PATENT AND TRADEMARK OFFICE
CERTIFICATE OF CORRECTION

PATENT NO. : 4,278,451
DATED : July 14, 1981
INVENTOR(S) : Rolf van der Piepen et al.

It is certified that error appears in the above—identified patent and that said Letters Patent is hereby corrected as shown below:

On The Title Page, the assignee should read

-- Rolf van der Piepen and

Gutehoffnungshutte Sterkrade AG,

Oberhausen, Fed. Rep. of Germany, a part interest. --.

Signed and Sealed this

Twenty-second Day of December 1981

[SEAL]

*Attest:*

*Attesting Officer*

GERALD J. MOSSINGHOFF

*Commissioner of Patents and Trademarks*

UNITED STATES PATENT AND TRADEMARK OFFICE
CERTIFICATE OF CORRECTION

PATENT NO. : 4,278,451

DATED : July 14, 1981

INVENTOR(S) : Rolf van der Piepen et al

It is certified that error appears in the above—identified patent and that said Letters Patent is hereby corrected as shown below:

On the title page, Assignee should read

-- (73) Assignee: Gutehoffnungshütte Sterkrade AG
                  Oberhausen, Fed. Rep. of Germany --

Signed and Sealed this

Second Day of March 1982

[SEAL]

Attest:

Attesting Officer

GERALD J. MOSSINGHOFF

Commissioner of Patents and Trademarks